(12) United States Patent
Visser (10) Patent No.: US 8,210,372 B2
(45) Date of Patent: Jul. 3, 2012

(54) STACKABLE CARRIER FOR GROWING MATERIAL

(75) Inventor: Anthony Visser, LJ's-Gravendeel (NL)

(73) Assignee: Visser's-Gravendeel Holding B.V., KH's-Gravendeel (NL)

( * ) Notice: Subject to any disclaimer, the term of this patent is extended or adjusted under 35 U.S.C. 154(b) by 1428 days.

(21) Appl. No.: 10/508,800

(22) PCT Filed: Apr. 3, 2003

(86) PCT No.: PCT/NL03/00252
§ 371 (c)(1),
(2), (4) Date: Apr. 3, 2006

(87) PCT Pub. No.: WO03/081987
PCT Pub. Date: Oct. 9, 2003

(65) Prior Publication Data
US 2006/0290087 A1 Dec. 28, 2006

(30) Foreign Application Priority Data
Apr. 3, 2002 (NL) ..................................... 1020295

(51) Int. Cl.
*B65D 19/28* (2006.01)
*B65D 21/04* (2006.01)
*B65D 21/032* (2006.01)
*B65D 19/42* (2006.01)

(52) U.S. Cl. ................ 211/126.7; 211/126.12; 108/53.5; 206/518

(58) Field of Classification Search ............. 211/126.11, 211/126.12, 126.7, 188, 126.2; 108/91, 53.1, 108/53.3, 53.5; 206/518, 519
See application file for complete search history.

(56) References Cited

U.S. PATENT DOCUMENTS

| | | | | |
|---|---|---|---|---|
| 817,689 A | * | 4/1906 | Bentley | 108/53.1 |
| 1,678,008 A | * | 7/1928 | Jackson | 206/518 |
| 1,742,738 A | * | 1/1930 | Turner | 108/53.5 |
| 1,934,389 A | * | 11/1933 | Ulsh | 108/53.3 |
| 2,046,095 A | * | 6/1936 | Shaw | 108/53.5 |
| 2,747,748 A | * | 5/1956 | Barefoot | 294/142 |
| 2,803,369 A | * | 8/1957 | Fleetwood | 220/485 |
| 2,964,217 A | * | 12/1960 | Mickler, Jr. | 206/519 |
| 3,565,017 A | * | 2/1971 | Jensen | 108/53.1 |
| 4,023,818 A | | 5/1977 | Troller | |

FOREIGN PATENT DOCUMENTS

| | | |
|---|---|---|
| CH | 332 368 | 8/1958 |
| CH | 369 404 | 5/1963 |
| DE | 1 658 736 | 7/1953 |
| DE | 17 89 189 | 5/1959 |
| DE | 33 13 839 | 11/1984 |
| EP | 0 174 896 | 3/1986 |
| FR | 2 661 155 | 10/1991 |

* cited by examiner

*Primary Examiner* — Michael Safavi
(74) *Attorney, Agent, or Firm* — Harness, Dickey & Pierce, P.L.C.

(57) ABSTRACT

The invention relates to a stackable carrier for growing material, such as pot plants, cuttings and plants placed in trays, comprising a substantially rectangular flat plate (35); and supports (36) extending transversely of the plate from the short sides of the plate for the purpose of supporting the carrier in a stack of carriers. This measure results in simplified handling of the carriers with the plants placed thereon. The carriers with the plants can be easily stacked on top of one another from above, wherein this is avoided in horizontal direction between the vertical posts of the Danish trolleys. Such operations therefore entail less effort. The invention furthermore provides the option of the grower using the carriers for his internal transport and even as carrier for the plants on the seedbeds. The supports preferably extend upward from the plate and the carrier comprises a frame extending at least at the periphery and a plate placed separately inside the frame.

18 Claims, 8 Drawing Sheets

STACKABLE CARRIER FOR GROWING MATERIAL

The invention relates to a stackable carrier for growing material, such as pot plants, cuttings and plants placed in trays.

Such stackable carriers are known in the form of racks which can be placed in so-called "Danish trolleys" which are used to transport the plant material from the grower to the auction, during transport within the auction and from the auction to wholesaler and retailer.

These known carriers are the source of much work, while the combination of trolley and trays placed thereon is highly susceptible to wear and contains many separate components, wherein travel with such trolleys results in a lot of noise.

When used for bedding plants the drawback occurs that the bedding plants must be transferred from seedbeds, on which they are cultivated, onto carriages for internal transport and then onto the grids or plates of the so-called Danish trolleys.

This results in frequent displacement and transfer of the pot plants, which is of course not really desirable.

The object of the present invention is to provide such a carrier, whereby these drawbacks are avoided.

This object is achieved with a stackable carrier, which comprises:
  a substantially rectangular flat plate; and
  supports extending transversely of the plate from the short sides of the plate for the purpose of supporting the carrier in a stack of carriers.

This measure results in simplified handling of the carriers with the plants placed thereon. The carriers with the plants can be easily stacked on top of one another from above, wherein moving of the carriers in horizontal direction between the vertical posts of the Danish trolleys is avoided. Such operations therefore entail less effort.

The invention furthermore provides the option of the grower using the carriers for his internal transport and even as carrier for the plants on the seedbeds.

According to a first preferred embodiment the carrier is provided on its side remote from the supports with locking elements provided for locking in horizontal direction the supports of the carrier placed above or below the carrier.

This measure provides a fixing of the stacked carriers in the horizontal plane so as to prevent the stack carriers tipping over and shifting.

According to a further preferred embodiment the supports extend upward from the plate.

Although it is possible in principle to have the supports extend downward, it is more attractive to have them extend upward, since in this manner they coincide with the load situated on the carrier and thus take up less space in the non-stacked position. Damaging of the load, in this case the plants, is moreover avoided as far as possible herewith.

A further embodiment provides the measure that under at least one of the supports a recess is arranged in the plate and that adjacently of the recess the plate is provided with a support surface for supporting underlying carriers.

By means of a small mutual shifting of the carriers it is hereby possible to choose between nested stacking and/or stacking with interspacing.

According to a particularly advantageous embodiment, the supports arranged on either side of the carriers have a different shape, wherein similarly shaped supports of carriers placed on top of each other are nestable and wherein differently shaped supports of carriers placed on top of each other maintain the distance between the carriers corresponding to the support height.

With this measure it is possible to stack the filled carriers on top of each other without damaging the load and to place the empty carriers nested into each other in order to save transport or storage space.

According to a specific preferred embodiment, the different supports of carriers placed on top of each other rest directly on one another. This results in direct contact between the supports, so that the vertical forces can be transmitted without interposing other elements.

A structurally attractive and strong embodiment teaches that the supports are each formed by a curved metal strip and that the strips are connected to a surface of an L-profile extending parallel to an end wall of a carrier, the other surface of which profile extends under the carrier.

According to a further preferred embodiment, the supports comprise four rods placed at the corners of the plate.

This configuration results in a structurally very simple embodiment; in this manner the supports are light, particularly when the rods take a hollow form.

According to a further preferred embodiment the rods are mutually connected on their side remote from the plate. The rods are hereby connected in pairs to form brackets which result in a greater degree of strength; this embodiment moreover results in an easy construction of the locking means in which the horizontal part of the bracket can fit.

According to yet another preferred embodiment, the supports are at least partly removable.

It is hereby possible to remove the brackets when the carriers are stored, so that the carriers can be stacked flat on top of each other and thus take up considerably less space.

The same effect can also be achieved when the supports are pivotally connected to the plate. The advantage of such a construction is that the supports cannot be detached from the carrier, although a hinge construction is on the other hand required and, when the hinges are adapted for folding inward of the brackets, space-saving during the stacking is not optimal.

According to yet another preferred embodiment, the flat plate of the carrier is manufactured from a plastic and the supports are at least partly manufactured from metal.

When the plates are manufactured from plastic, this results in a great weight-saving and no susceptibility to rusting, rotting and other forms of degradation.

It is of course possible to manufacture the supports wholly from plastic but, in view of the heavy loading of the supports when carriers with a heavy load are stacked high onto one another, these supports are heavily loaded, which would require a thick form of plastic.

It is therefore attractive when the supports comprise a part which is formed integrally with the plate and which extends upward over a part of the height of the supports and on which are mounted the metal parts of the supports. A combination is hereby obtained of the advantages of plastic, such as a light weight and durability, with the strength of metal, wherein it is furthermore attractive that the metal rods take up little space and thus cause little shadow on the growing material present on the carrier.

In order to make the supports removable in this embodiment also, the supports are formed by a metal rod formed into a bracket, wherein the ends of the bracket extend into the plastic part of the support.

It is indeed possible herein that the supports are fixed sufficiently firmly with a sufficiently great length of support of the rods or brackets by the plastic of the plastic part of the supports. An attractive preferred embodiment further results when the bracket is stepped at its corners and the locking elements comprise cavities formed in the side of the plate remote from the support.

This embodiment provides the advantage of rods placed at the corners and ensuring a maximum stability, while the stepped form results in a possibility of a simple construction of the locking element of the carrier placed in the stack above the carrier.

This latter advantage is developed further when the cavities of the locking elements are open toward the short side of the carrier. The possibility of dirt collecting in said locking elements is hereby small, while cleaning can furthermore take place easily.

According to a further preferred embodiment, grooves extending transversely of the longitudinal direction of the plate are arranged in the carrying surface of the plate. It is hereby easy to shift plants back and forth over the carrier in the relevant direction.

When the grooves are embodied as slots, the same advantage results, while water leaving plants moreover flows away readily in downward direction. This advantage also applies in cleaning of the carriers with water.

According to a particularly strong embodiment, the carrier comprises a frame extending at least at the periphery and a plate placed separately inside the frame.

The steel frame provides the possibility of a construction of sufficient strength and rigidity, while the separate plate makes it possible to choose a light material, so that a light construction is obtained.

This is found to be particularly the case when the frame is manufactured from metal, preferably steel, and the plate is manufactured from plastic.

The separate construction of plate and frame provides the option of constructing the combination such that, when the plate is removed, the frames are nestable in laterally offset manner. Another advantage is the fact that the plate can be pressed straight upward or obliquely upward. This is attractive when the load present on the carrier must be moved by means of for instance a sliding device to a carrier located at a different level.

Other attractive preferred embodiments are specified in the remaining sub-claims.

The present invention will be elucidated herein below with reference to the annexed figures, in which.

Figures 1, 2:
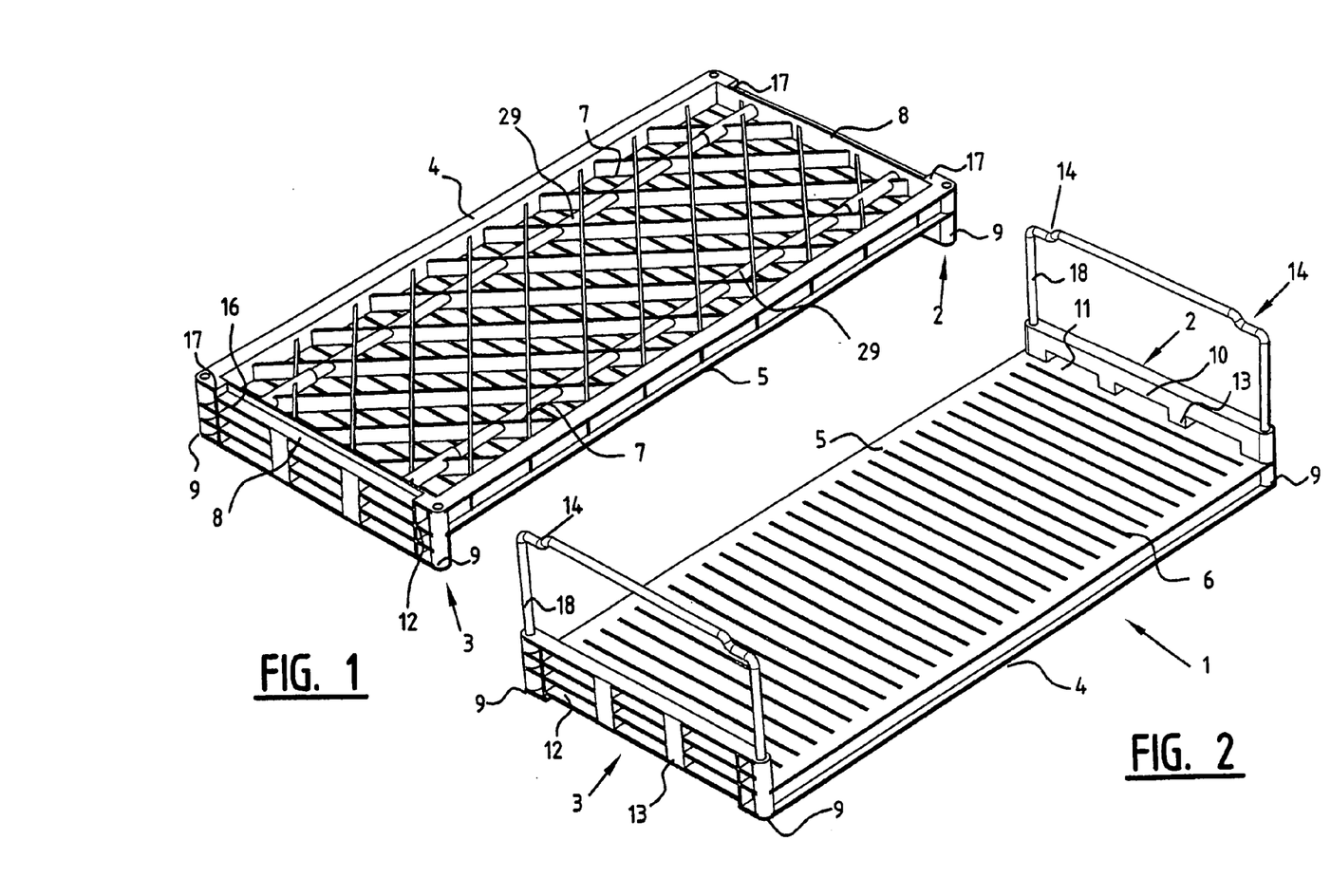
FIG. 1 is a perspective partial view of a carrier according to a first embodiment according to the invention.
FIG. 2 is a perspective view of the underside of the carrier shown in FIG. 1.

FIG. 1 shows a rectangular plate 1 which is manufactured from plastic. On both short sides is arranged an upright wall 2 respectively 3. Walls 2,3 are formed integrally with plate 1.

The flat plate 2 comprises two substantially U-shaped profiles 4,5 extending along the long sides. Continuous slots 6 are arranged in the part of the flat plate between profiles 4,5.

As shown in FIG. 2, ribs 7, which extend in the diagonal direction and have a strengthening function, are arranged on the underside of the flat plate. These ribs extend between U-shaped profiles 4,5 and parts 8 of upright sides 2 respectively 3 which extend under the level of flat plate 1.

Side walls 2,3 comprise tubular elements 9 placed at the corner points and an actual inward directed wall 10 which extends between tubular elements 9 and in which are recessed openings 11. In upright side walls 2,3 are arranged strengthening ribs 12 extending parallel to plate 1, a number of which ribs extends adjacently of openings 11. Two rectangular profiles 13 are further arranged in order to strengthen the upright sides.

The carrier described up to this point is manufactured wholly from plastic. A strong plastic is used for this purpose such as ABS.

Figure 3:
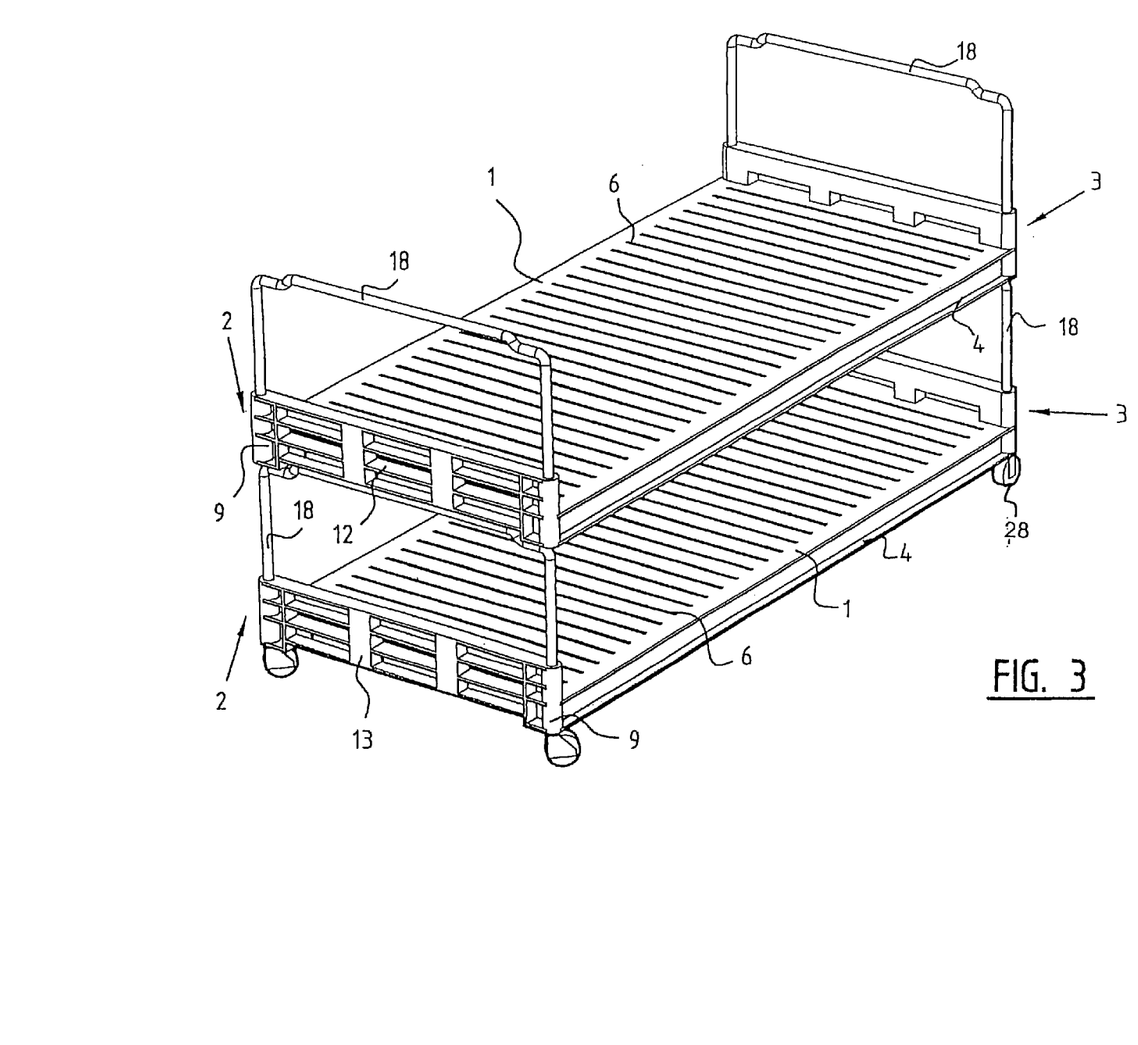
FIG. 3 is a perspective view of two carriers according to the first embodiment stacked one on top of the other.

In view of the fact that this carrier is used substantially for plant material and in view of the fact that the carrier must be stackable; there are arranged brackets 18 which can be seen in FIGS. 1-3. Brackets 18 are preferably manufactured from a metal such as aluminium. This is related to the relatively heavy loading of these brackets, particularly when heavily loaded trays are stacked high on top of each other. Brackets 18 are fixed into the tubular elements 9 of upright side walls 2,3. In the vicinity of their corner points the brackets 18 are embodied with a stepped form 14. The stepped form 14 is important in the stacking of the carriers; the elevated part 15 of bracket 14 is herein engaged in a cavity 16 in the part of the sides extending under flat plate 1.

Movement in the longitudinal direction of the flat plates is herein prevented by wall parts 8, while movement in transverse direction of the flat plate is prevented by wall parts 17. A firm fixation in the horizontal plane thus takes place of the carriers placed one on top of another.

In order not to have to make use of the so-called Danish trolleys during transport of a stack of carriers, a certain part of a set of carriers can be provided with wheels 28, as shown in FIG. 3. It is-herein easy to travel with a stack of 5 to 6 of these carriers without further assist means.

Brackets 18 can be removed to enable the volume of the carriers to be reduced during empty transport.

It is otherwise also possible to embody the brackets for inward pivoting. The hinge will herein have to be stoppable so as to provide sufficient strength, and the hinge will have to be situated on the intersecting line of side wall 2,3 and plate 1.

Figure 4:
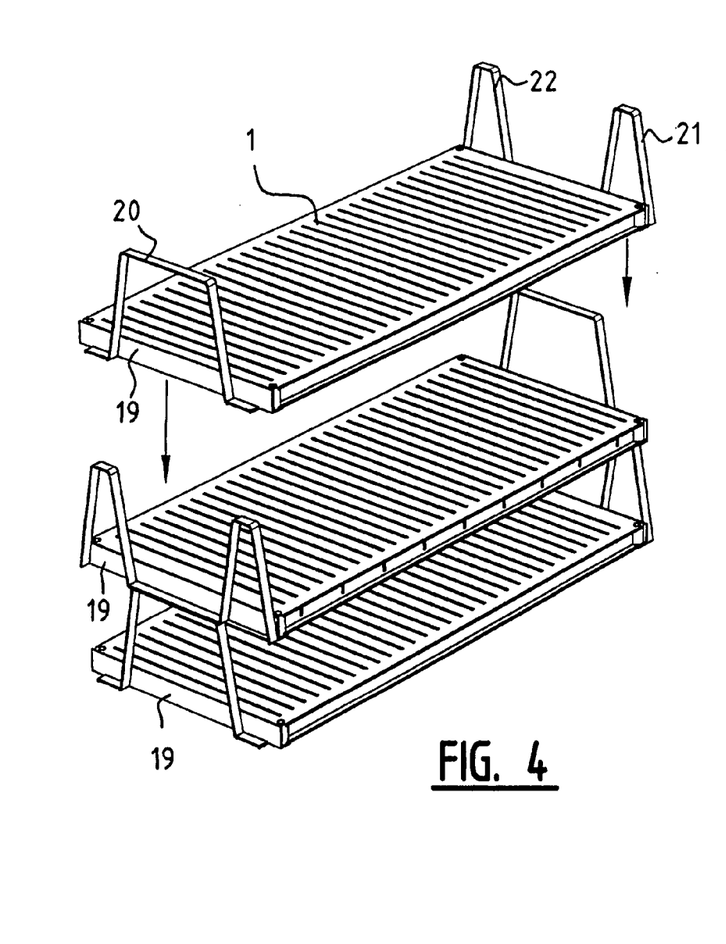
FIG. 4 is a perspective view of a series of carriers according to a second embodiment stacked one on top of another.
Figure 5:
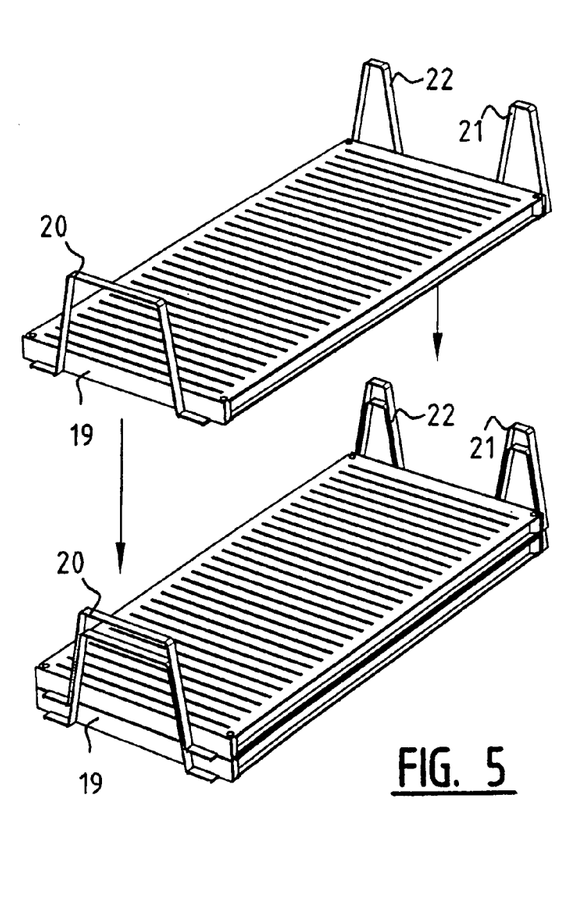
FIG. 5 is a perspective view of a series of carriers according to the second embodiment nested in each other.

FIGS. 4 and 5 show a second embodiment of the carrier according to the invention, the flat plate of which substantially corresponds with flat plate 1 of the previous embodiment. This can also be manufactured from plastic and be provided with the diverse components elucidated on the basis of the first embodiment. On each of the short sides is arranged an L-shaped profile 19, the short side of which extends under flat plate 1 so that flat plate 1 supports on the L-shaped profile.

On one side of each plate is arranged a first steel bracket 20 and on the other short side of the flat plate the relevant L-shaped profile 19 is connected to two steel brackets 21 respectively 22. Brackets 20-22 are herein connected to the relevant L-shaped profile by means of welding. For the connecting of L-shaped profiles 19 to flat plate 1 use can be made of rod-like connecting elements which extend through the plastic of flat plate 1 and which are connected to the relevant L-shaped profiles by means of a nut connection. A strong whole is hereby obtained.

The form of brackets 20 respectively 21 and 22 is such that, as shown in FIG. 4, the carriers can be stacked on top of each other with a mutual interspacing which corresponds with roughly the height of the carriers. The carriers can herein be used to transport material, in particular pot plants.

The carriers are herein essentially stacked with every other carrier being turned round.

It is however also possible, as shown in FIG. 5, to place the carriers on top of each other with the brackets or support elements of the same shape. Brackets 19-21 then nest in each other, so that the flat plates can be stacked close together, for instance during return transport or for storage of the empty carriers.

Figure 6:
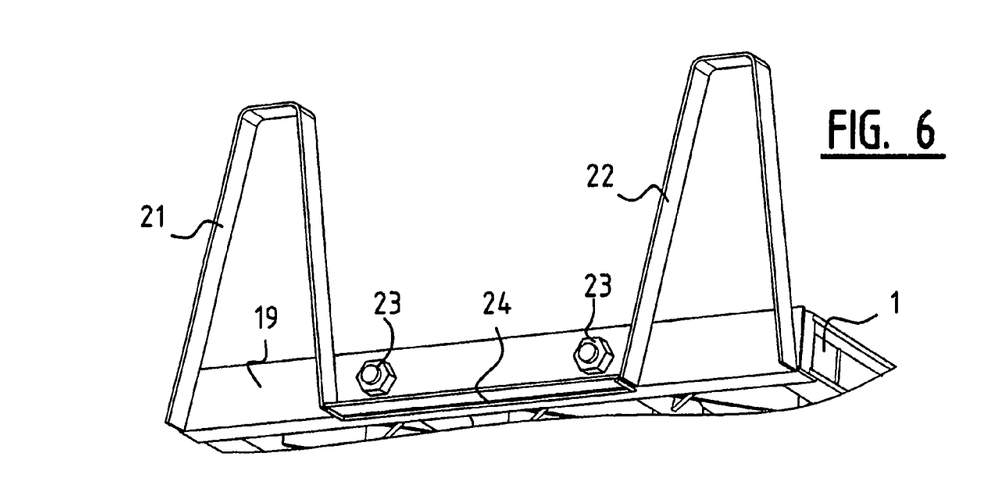
FIG. 6 is a perspective view of a detail of the second embodiment.

FIG. 6 shows in more detail the construction of an L-shaped profile 19 and the supports 21 and 22 connected thereto. This shows that a recess is made in the L-shaped profile, in which a carrying bracket 24 is placed. This carrying bracket 24 is for instance bent out of round bar and fixed in L-shaped profile 19 by means of a welded connection. Carrying bracket 24 herein protrudes relative to L-shaped profile 19 so as to rest on the bracket 20 of the other end of a corresponding carrier.

Figure 7:
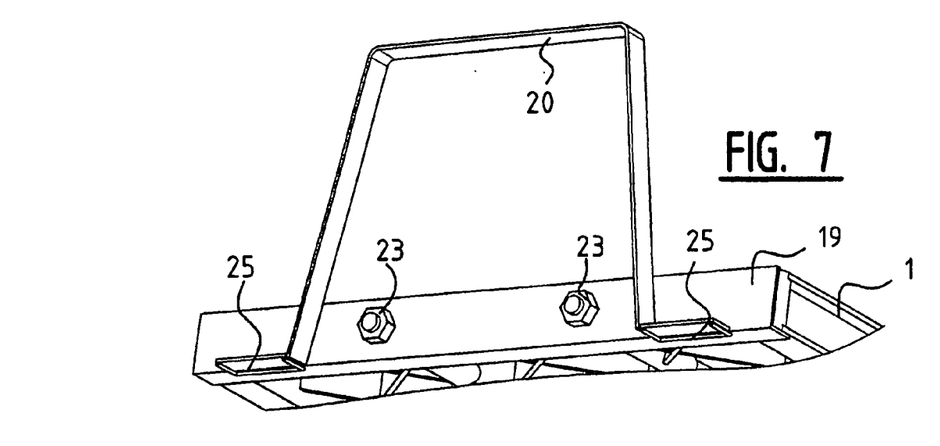
FIG. 7 is a perspective view of another detail of the second embodiment.

Made in similar manner in the other L-shaped profile 19 are two recesses, in which carrying brackets 25 are received and mounted fixedly on the relevant L-shaped profile 19. These carrying brackets also serve to support on the brackets 21 respectively 22 placed thereunder. They are also provided for this purpose with relevant protrusions.

Figure 8:
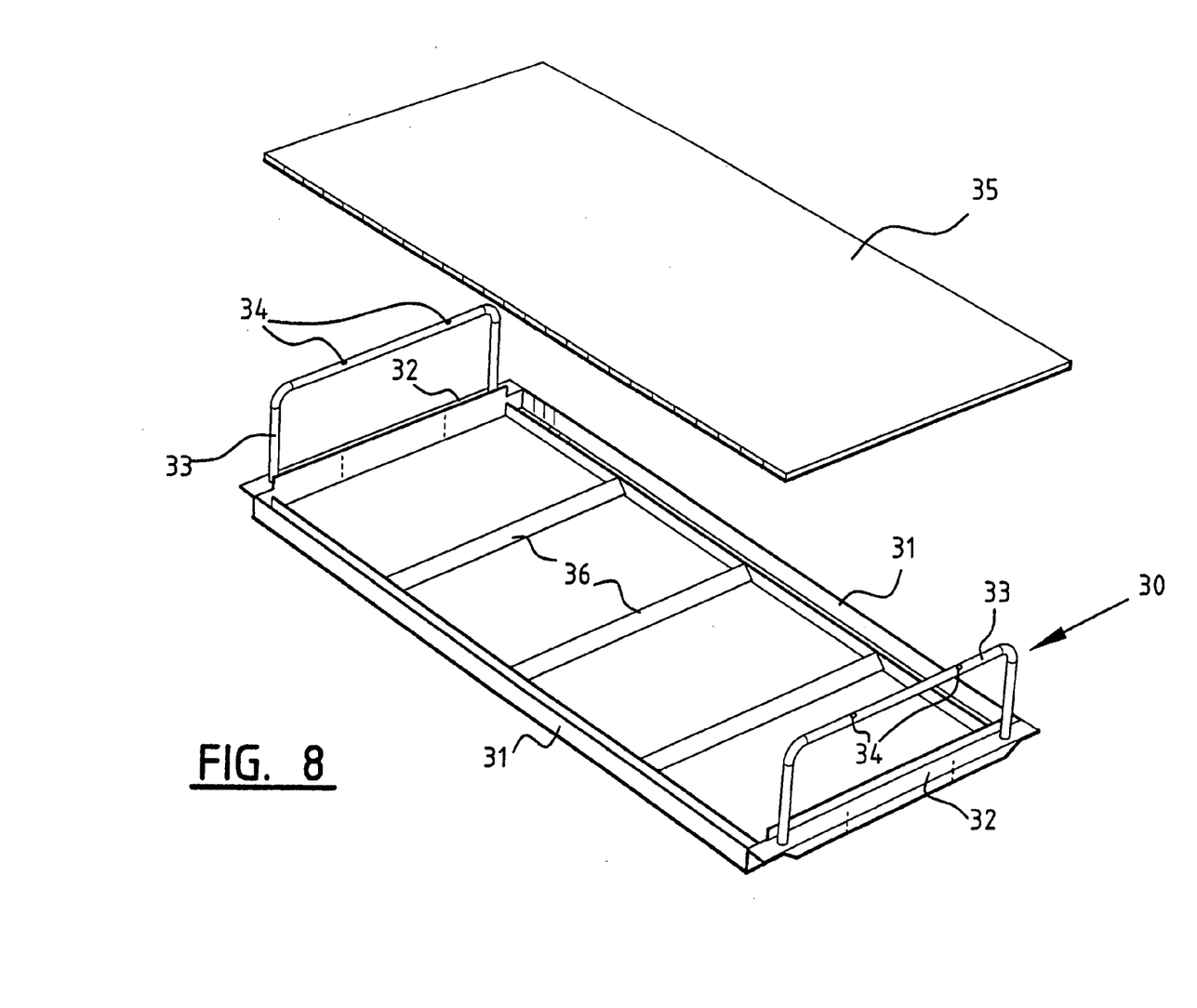
FIG. 8 is a perspective view of a third embodiment of the invention.

In FIG. 8 a third embodiment of the stackable carrier is shown. This is formed by a frame 30 which is preferably formed from metal such as steel. The frame comprises two U-profiles 31 extending in the longitudinal direction, wherein the legs are different and the outer leg is the higher. Both profiles are connected at their end by a transverse profile 32 with a substantially Z-shaped section.

Welded onto the horizontal part of the Z-shaped profile are tubular brackets 33, which serve as supports. The brackets 33 are provided on their upper side with holes 34 for receiving pins (not shown) of the carrier stacked onto the brackets. The pins may be welded onto the underside of the horizontal part of the Z-shaped profile.

Welded between U-shaped profile 31 are transverse profiles 36 for supporting the plate for placing in frame 30.

The whole unit described up to this point is manufactured from steel and is galvanized for increased durability.

In order to carry the load a plate 35 is placed between the outer high walls of U-profiles 31 and between Z-profiles 32. This plate can be manufactured from numerous materials, but it is recommended to manufacture it from a strong, light material not sensitive to water and dirt, such as plastic. A light plate is obtained particularly when a profile is applied which is extruded from plastic and provided with channels extending in the longitudinal direction.

Figure 9:
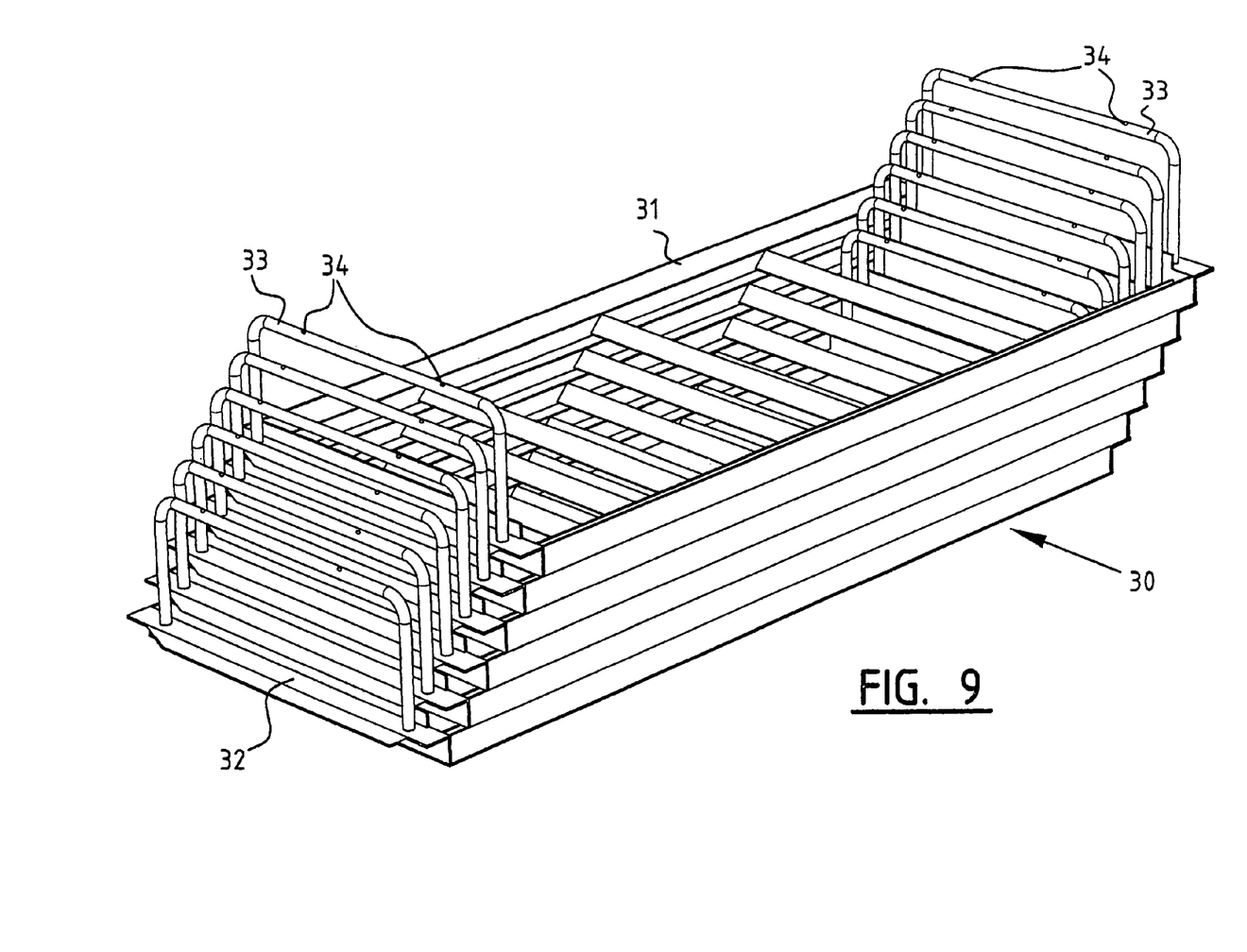
FIG. 9 is a perspective view of nested frames according to the third embodiment.

FIG. 9 shows a view of nested frames 30. It is apparent herein that in the case of nesting the frames must be displaced in horizontal direction in order to fit into each other. This is a drawback relative to the other embodiments, although the present embodiment is sturdier and cheaper.

Figure 10:
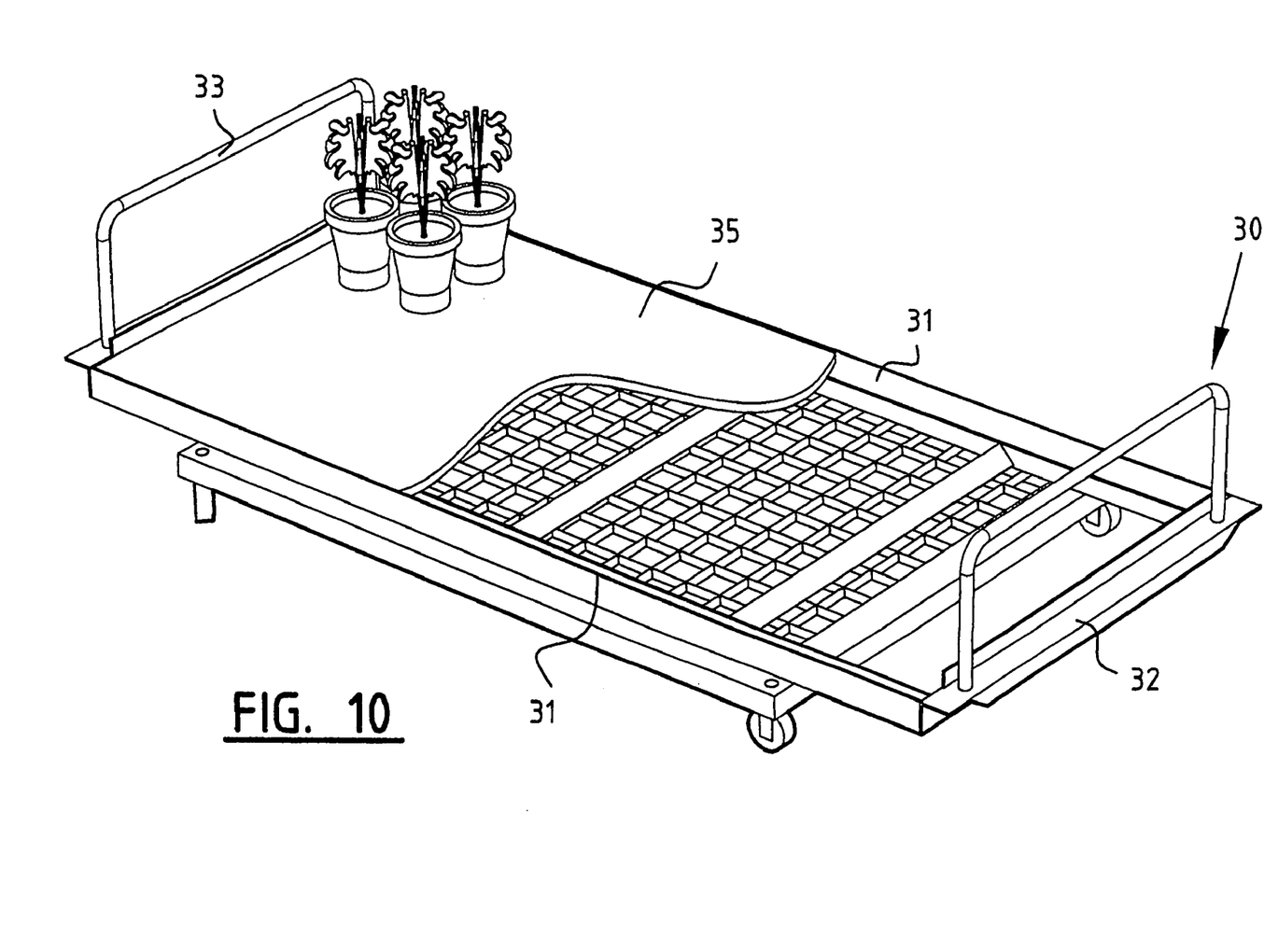
FIG. 10 is a partly broken-away perspective view of the carrier according to the third embodiment while it is placed on a 'Danish' trolley.

The configuration of the carrier according to the third embodiment is clearly shown in FIG. 10, wherein the carrier is placed on a Danish trolley.

Figure 11:
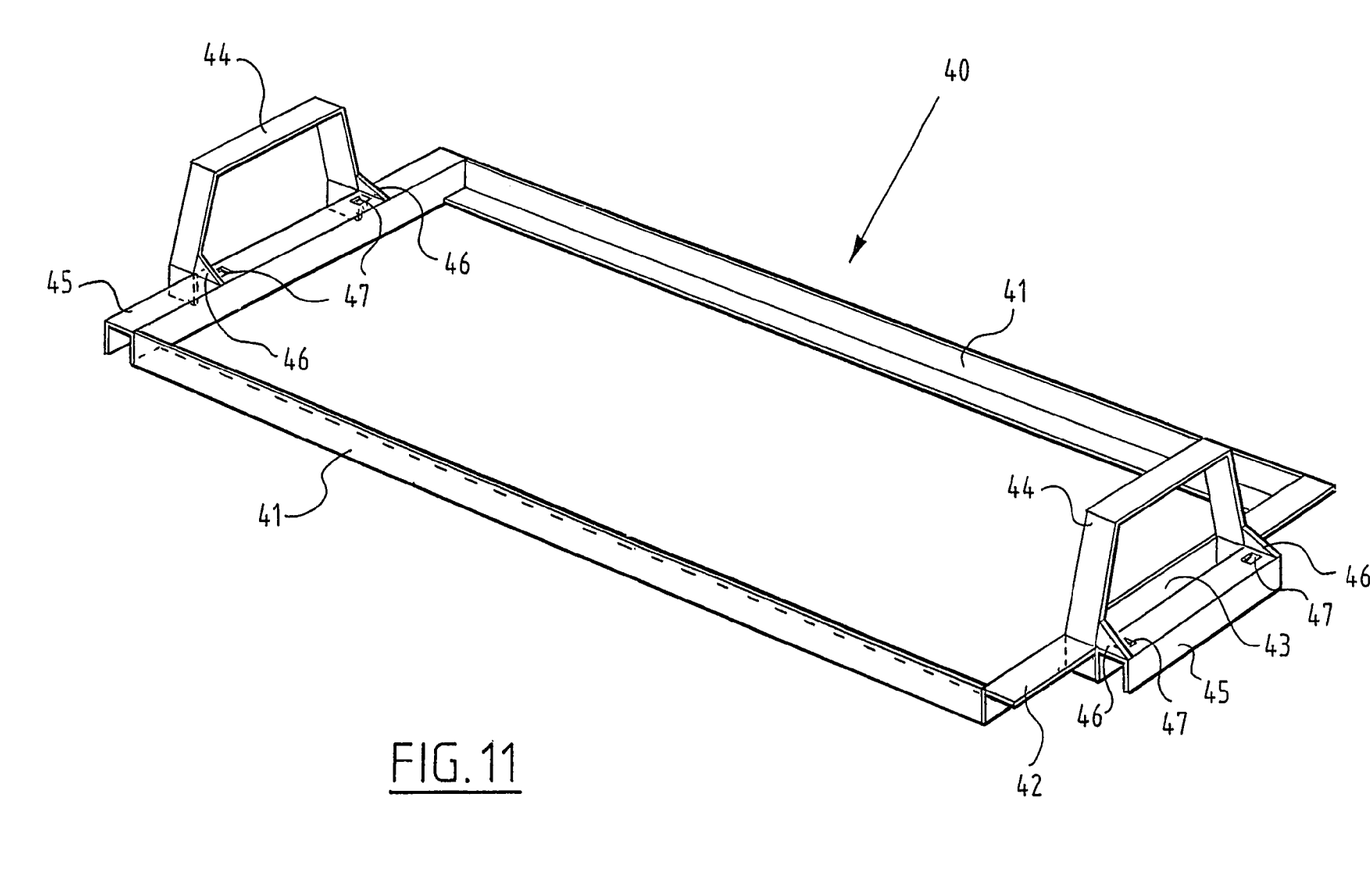
FIG. 11 is a perspective view of a fourth embodiment.

FIG. 11 shows another embodiment, wherein the frames are likewise nestable, albeit in a different manner. Frame 40 of the embodiment shown in FIG. 11 is also provided with upright edges 41, inside which separate plates can be arranged or inside which separate grids can be arranged to carry pot plants or other plant material. An attractive advantage of this embodiment with a separate base, which is otherwise also the case for the other embodiments in which a separate base or plate is applied, is the fact that it can be pushed upward from below. This has the result that such carriers can be applied in slide transfer machines when for instance pot plants must be shifted from one carrier to another. Height differences can herein be absorbed by lifting the plate.

Another specific measure of this embodiment is the fact that the frame is formed on one side by an L-shaped profile 42, the horizontal part of which is provided with an interruption 43. This interruption 43 is situated precisely below brackets 44. At the position of the interruption a U-shaped support profile 45 is fixed to L-shaped profile 42. The U-shaped profile is fixed by means of welding and is strengthened by means of fishplates 46. It will be apparent that it is likewise possible to arrange such fishplates at other positions. Arranged in U-shaped profile 45 are recesses which are created by making a U-shaped cut in the upper surface and bending the thus resulting lip 47 downward. When the carriers are stacked on top of each other, a U-shaped profile 45 is placed over bracket 44, wherein the lips 47 provide a lateral locking. A similar configuration is arranged on the other short side, with the understanding that U-shaped profile 45 herein forms the short side of frame 40. In this U-shaped profile 45 are therefore arranged the recesses for forming the locking lips 47. In this embodiment the bracket 44 is displaced outward in the longitudinal direction of the carrier. A free space is hereby automatically created under bracket 44 which, as in the other embodiment, can be used for nesting the carriers.

In this embodiment it is thus possible as required to nest the carriers or stack them on top of each other with interspacing, wherein the carriers do not have to be turned round when the manner of stacking is changed.

It will be apparent that diverse modifications can be made to the shown constructions without departing from the present invention.

The invention claimed is:

1. A stackable carrier for growing material, comprising:
a substantially rectangular flat plate; and
supports extending transversely of the flat plate from short sides of the flat plate for supporting the carrier in a stack of carriers with interspacing formed therebetween for the growing material, wherein:
the supports extend upward from the flat plate;
adjacently to the short sides of the flat plate, U-shaped profiles including support surfaces for supporting underlying carriers are provided;
under one support, an interruption is provided for receiving the support of an underlying carrier, such that the carrier is nestable during return of transport or stores empty carriers with less space taken up by the carriers than in a stacked carrier position; and
adjacent to the interruption, one of the U-shaped profiles is fixed to the support.

2. The carrier as claimed in claim 1, wherein the U-shaped profiles are provided with locking elements for lateral locking the supports of another carrier placed below the carrier.

3. The carrier as claimed in claim 1, wherein the carrier comprises a frame extending at least at a periphery so that the flat plate is placed separately inside the frame.

4. The carrier as claimed in claim 3, wherein the frame encloses the flat plate in a horizontal plane and wherein the supports are fixed to the frame.

5. The carrier as claimed in claim 3, wherein the interruption is arranged in the frame.

6. The carrier as claimed in claim 3, wherein the frame is manufactured from metal.

7. The carrier as claimed in claim 3, wherein the frame is manufactured from galvanized steel.

8. The carrier as claimed in claim 1, wherein the supports are each formed by a metal strip.

9. The carrier as claimed in claim 1, further comprising:
   a L-shaped profile provided at one of the short sides of the flat plate; and
   locking elements formed via lips provided on the support surface of the U-shaped profiles.

10. The carrier as claimed in claim 9, wherein the locking elements are provided to lock with a respective support when multiple carriers are stacked on top of each other.

11. The carrier as claimed in claim 2, wherein the carrier comprises a frame extending at least at a periphery so that the flat plate is placed separately inside the frame.

12. The carrier as claimed in claim 1, wherein a Danish trolley is arrangeable thereunder.

13. The carrier is claimed in claim 1, wherein the supports are integrally formed with the U-shaped profiles.

14. The carrier as claimed in claim 9, wherein the U-shaped profiles are fixed to the supports.

15. The carrier as claimed in claim 1, wherein arranged in the U-shaped profiles are recesses each of which are created by making a pair of U-shaped cuts in an upper surface thereof.

16. The carrier as claimed in claim 1, wherein when multiple carriers are nested, the support is received in the interruption and extends through the interruption until just below an adjacent upper carrier.

17. The carrier as claimed in claim 1, wherein on one short side of the flat plate, the interruption is arranged in a L-shaped profile into which one of the support of an underlying carrier is provided.

18. The carrier as claimed in claim 1, wherein the U-shaped profiles are reinforced to respective supports with fishplates.

* * * * *